United States Patent
Ramaswamy

[11] 3,770,339
[45] Nov. 6, 1973

[54] SWITCH FOR FIBER-OPTIC TRANSMISSION SYSTEMS

[75] Inventor: Vellayan Ramaswamy, Lincroft, N.J.

[73] Assignee: Bell Telephone Laboratories, Incorporated, Murray Hill, N.J.

[22] Filed: Dec. 6, 1972

[21] Appl. No.: 312,562

[52] U.S. Cl. ...... 350/160 R, 350/96 R, 350/96 WG
[51] Int. Cl. .......................... G02f 1/34, G02b 5/14
[58] Field of Search .................... 350/160 R, 96 R, 350/96 WG, 175 GN

[56] References Cited
UNITED STATES PATENTS

| | | | |
|---|---|---|---|
| 3,030,852 | 4/1962 | Courtney-Pratt | 350/96 R |
| 3,442,568 | 5/1969 | Siegmund et al. | 350/96 R |
| 3,589,794 | 6/1971 | Marcatili | 350/160 R |

*Primary Examiner*—Ronald L. Wibert
*Assistant Examiner*—V. P. McGraw
*Attorney*—W. L. Keefauver et al.

[57] ABSTRACT

An optical switch for fiber-optic light guides utilizes an electrically induced change in the index of refraction of the switch material to produce the switching effect. Electrode rings are spaced along a cylindrical member of electro-optic switch material, which is placed between two sections of a fiber-optic light guide. When a voltage is applied between the electrodes, an electric field is produced in the switch material causing a change in the index of refraction and the creation of a light guide through the switch material. Removal of the voltage will destroy the guide in the switch material, thereby blocking transmission.

4 Claims, 2 Drawing Figures

SWITCH FOR FIBER-OPTIC TRANSMISSION SYSTEMS

BACKGROUND OF THE INVENTION

This invention relates to fiber-optic light guides and, more particularly, to electro-optic switches for fiber-optic light guides.

With the development of optical communication systems in recent years, a great deal of research has been directed toward the development of modulators or switches for the fiber-optic cables which can be used as light conductors. One of the basic types of switches for light conducting rods employs a Kerr effect liquid surrounding the rod. Ordinarily, the index of refraction of the liquid is lower than that of the rod, However, the application of an electric field to the liquid, by applying a voltage between the metallic outer surface of the liquid container and a conductor near the rod, will cause the index of the Kerr liquid to increase. This will cause some of the light to leak out of the light conducting rod, thereby modulating or switching the light.

Another technique for switching light in a light conducting rod involves the use of a ring-like transducer around the guide. This transducer acoustically induces a variation in the index of refraction. If the acoustic wavelength is adjusted such that it is one-half that of the light wavelength, then the periodically varying index caused by the acoustic wave establishes a stop band for the light. This occurs because each variation in the index causes a small reflection of the light wave passing through it and, since the variations have been adjusted to one-half the wavelength of the light, the reflections add in phase. Therefore, there will be a cumulative effect resulting in complete reflection of the light at a particular frequency.

A much more useful switch than those described in the prior art could be created, especially for relatively inaccessible locations, if the Kerr effect liquid or the acoustic generator could be eliminated. It is, therefore, the object of this invention to provide switching for a fiber-optic transmission system without these elements and with relatively simple construction.

SUMMARY OF THE INVENTION

The present invention is directed toward simplifying the structure needed to create a switch for fiber-optic light guides by relying on induced changes in the index of refraction of the switch material which cause it to act as a light guide.

In an illustrative embodiment of the invention, the switch consists of a cylindrical member of electro-optic material located between two sections of a fiber-optic light guide. Ring-like electrodes are located around both ends of the switch material. When a voltage is applied between the electrodes an electric field is created along the length of the switch material. This field induces an index of refraction distribution which is greater at the center of the cylinder of switch material and decreases toward the surface. This, in effect, creates a light guide through the switch material when the field is present. Removal of the field destroys the guide through the switch material, thereby blocking light transmission from one segment of a fiber-optic light guide to the other.

The foregoing and other features of the present invention will be more readily apparent from the following detailed description and drawings.

DETAILED DESCRIPTION

Figure 1:
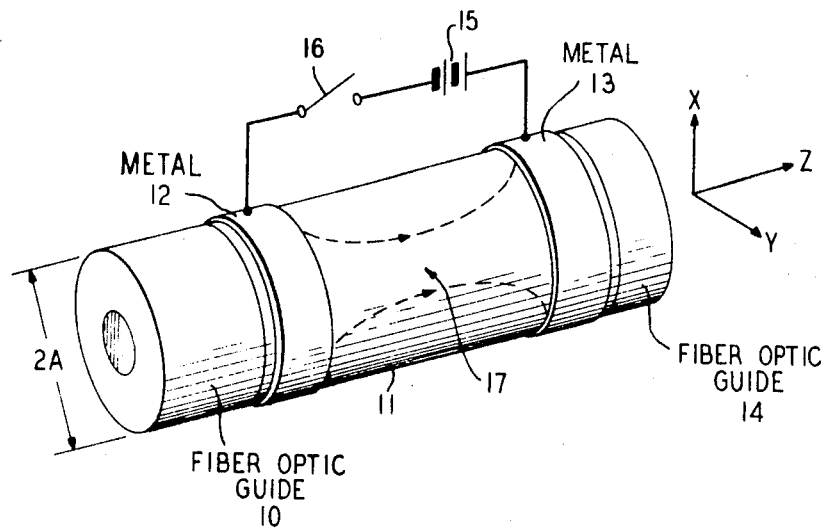
FIG. 1 is an illustrative embodiment of the invention.

In the FIG. 1 the switch material, 11, is shown located between two sections of a fiber-optic light guide, 10 and 14 respectively. The switch material may be any electro-optic crystalline material, such as lithium niobate ($LiNbO_3$), or lithium tantalate ($LiTaO_3$), with its axis along the principal (Z) axis of the crystal. For greater efficiency, the index of refraction of the core of the fiber-optic guide and switch material should be fairly close to one another.

Located around each end of the switch material are metal electrodes, 12 and 13 respectively. Connected in series between these two electrodes is a voltage source 15 and a switch 16. When the switch is closed, the voltage source is connected across the electrodes and an electric field 17 is produced along the Z direction in FIG. 1. The field 17 is a maximum near the surface of the switch material and decreases toward zero near the axis. This induces equal negative index changes along both the X and Y directions in FIG. 1. Therefore, $$n_x = n_y = n_o - \tfrac{1}{2}n_o^3 r_{13} E$$

where $n_x$ and $n_y$ are the indices of refraction in the X and Y directions with the field present, $n_o$ is the ordinary index of refraction of the switch material, $r_{13}$ is the electrooptic coefficient of the switch material affecting the index change for this configuration, and $E$ is the field strength. From this Equation it can be seen that these indices are a minimum near the surface and reach a value $n_o$ at some radius from the center where the field is substantially zero. The index distribution is, therefore, the inverse of the applied electric field and, consequently, creates a light guide through the switch material when the field is present. When the field is removed by opening switch 16, the guide is destroyed and transmission is halted by a leakage process. The leakage occurs because the index throughout the switch is the same.

Figure 2:
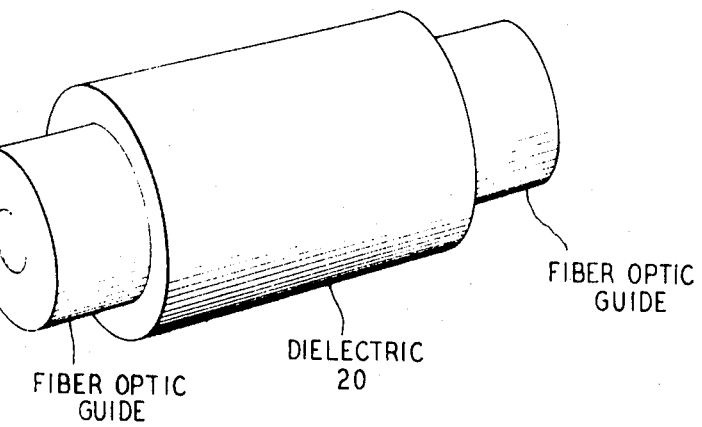
FIG. 2 shows a dielectric material covering the embodiment of FIG. 1.

To assure a good extinction ratio, the switch material must be long enough to leak away most of the optical energy when the field is removed. However, in the OFF state, the switch material suspended in air may act as a light guide. Therefore, depending on the material chosen, it may be desirable to imbed the whole switch in a medium of higher index of refraction as indicated by material 20 in FIG. 2. This dielectric material may also serve to protect the switch from environmental effects and to splice the two sections of fiber-optic guide together.

The length and width of the electrodes, the diameter of the switch material, and the length of the switch material can be chosen to optimize the performance. It should be noted, also, that since $n_x = n_y$ in this structure, the switching effect is independent of polarization and can be used to switch unpolarized light.

While the invention has been particularly shown and described with reference to specific embodiments thereof, it will be understood by those skilled in the art that various changes in form and details may be made

I claim:

1. An electro-optic switch for modulating light traveling in a fiber-optic light guide comprising:
   a member of electro-optic material located between segments of said fiber-optic light guide, said member of electro-optic material being oriented so that its optic axis is parallel with the axis of said fiber-optic light guide; and
   means for creating a variation in the index of refraction of said member of electro-optic material from a maximum along the axis of said fiber-optic light guide to a minimum near the surface of said member of electro-optic material, comprising a first electrode around one end of said member of electro-optic material, a second electrode around the other end of said member of electro-optic material and means for applying a voltage difference between said electrodes.

2. An electro-optic switch as claimed in claim 1 wherein said member of electro-optic material consists of lithium niobate ($LiNbO_3$).

3. An electro-optic switch as claimed in claim 1 wherein said member of electro-optic material consists of lithium tantalate ($LiTaO_3$).

4. An electro-optic switch as claimed in claim 1 further including a dielectric material surrounding said switch, said dielectric material having an index of refraction higher than the index of refraction of said switch material.

* * * * *